(12) United States Patent
Ciaraldi-Schoolmann et al.

(10) Patent No.: US 11,619,164 B2
(45) Date of Patent: Apr. 4, 2023

(54) SHUT-OFF MEMBER FOR CHANNEL CONNECTION AND CHANNEL DISCONNECTION OF A TURBOCHARGER, AND INTERNAL COMBUSTION ENGINE AND VEHICLE WITH A SHUT-OFF MEMBER OF THIS TYPE

(71) Applicant: Bayerische Motoren Werke Aktiengesellschaft, Munich (DE)

(72) Inventors: Franco Ciaraldi-Schoolmann, Hage (DE); Harun Kara, Neufahrn b. Freising (DE); Dirk Christian Leinhos, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 21 days.

(21) Appl. No.: 17/299,407

(22) PCT Filed: Nov. 28, 2019

(86) PCT No.: PCT/EP2019/082954
§ 371 (c)(1),
(2) Date: Jun. 3, 2021

(87) PCT Pub. No.: WO2020/114882
PCT Pub. Date: Jun. 11, 2020

(65) Prior Publication Data
US 2022/0056838 A1 Feb. 24, 2022

(30) Foreign Application Priority Data
Dec. 4, 2018 (DE) ...................... 10 2018 130 829.9

(51) Int. Cl.
*F02B 37/22* (2006.01)
*F01P 3/20* (2006.01)
(Continued)

(52) U.S. Cl.
CPC ................ *F02B 37/22* (2013.01); *F01P 3/20* (2013.01); *F02B 37/18* (2013.01); *F02B 37/183* (2013.01);
(Continued)

(58) Field of Classification Search
CPC ...... F02B 37/025; F02B 37/18; F02B 37/183; F02B 37/22; F16K 49/00; F16K 49/005; F01P 3/20; F01P 2060/00; F02F 1/4264
See application file for complete search history.

(56) References Cited

U.S. PATENT DOCUMENTS

| 4,339,922 A | 7/1982 | Navarro |
| 10,767,554 B2 | 9/2020 | Mehne et al. |

(Continued)

FOREIGN PATENT DOCUMENTS

| CN | 106014579 A | 10/2016 |
| DE | 10 2015 116 555 A1 | 4/2016 |

(Continued)

OTHER PUBLICATIONS

PCT/EP2019/082954, International Search Report dated Feb. 19, 2020 (Two (2) pages).

(Continued)

*Primary Examiner* — Loren C Edwards
(74) *Attorney, Agent, or Firm* — Crowell & Moring LLP

(57) ABSTRACT

A shut-off member for a turbocharger for an internal combustion engine includes a first channel, a second channel, and a wall that separates the first channel from the second channel. A shut-off member opening is formed in the wall that connects the first channel and the second channel. The shut-off member opening is selectively openable and closable by a shut-off member body. A cooling channel is disposed in the wall and at least partially surrounds the shut-off member opening.

8 Claims, 2 Drawing Sheets

(51) Int. Cl.
*F02F 1/42* (2006.01)
*F02B 37/18* (2006.01)

(52) U.S. Cl.
CPC ........ *F02F 1/4264* (2013.01); *F01P 2060/00* (2013.01)

(56) References Cited

U.S. PATENT DOCUMENTS

| | | | |
|---|---|---|---|
| 10,871,102 B2 | 12/2020 | Sparrer et al. | |
| 2012/0090320 A1* | 4/2012 | Kuhlbach | F02F 1/243 123/41.82 R |
| 2013/0031901 A1* | 2/2013 | Kuhlbach | F02F 1/40 60/599 |
| 2016/0102604 A1* | 4/2016 | Wu | F02B 37/004 60/602 |
| 2020/0332677 A1* | 10/2020 | Hiller | F01D 25/145 |

FOREIGN PATENT DOCUMENTS

| | | |
|---|---|---|
| DE | 20 2016102 796 U1 | 7/2016 |
| DE | 10 2016 207 745 A1 | 11/2017 |
| DE | 10 2016 208 159 A1 | 11/2017 |
| DE | 10 2016 208 160 A1 | 11/2017 |
| EP | 1 426 603 A1 | 6/2004 |
| EP | 2 818 661 A1 | 12/2014 |
| WO | WO 2007/060831 A1 | 5/2007 |
| WO | WO-2017190884 A1 * 11/2017 ........... F01D 25/145 |

OTHER PUBLICATIONS

German Search Report issued in German application No. 10 2018 130 829.9 dated Jul. 8, 2019, with Statement of Relevancy (Seven (7) pages).

Chinese Office Action issued in Chinese application No. 201980057712.8 dated Dec. 30, 2021, with English translation (Twelve (12) pages).

* cited by examiner

SHUT-OFF MEMBER FOR CHANNEL CONNECTION AND CHANNEL DISCONNECTION OF A TURBOCHARGER, AND INTERNAL COMBUSTION ENGINE AND VEHICLE WITH A SHUT-OFF MEMBER OF THIS TYPE

BACKGROUND AND SUMMARY OF THE INVENTION

The invention relates to a shut-off member for channel connection and channel separation of a turbocharger. By means of this channel connection and channel separation, it is possible to affect a switchover between ram supercharging and pulse supercharging of a turbocharger for an internal combustion engine. The invention furthermore relates to an internal combustion engine having such a shut-off member, and to a vehicle having such an internal combustion engine or shut-off member.

Shut-off members for connecting and separating channels of a turbocharger are known from the prior art. This switching can serve for bringing about pulse supercharging in the lower engine speed range with the shut-off member closed, and ram supercharging in the upper engine speed with the shut-off member open, with a geometrically identical manifold. This has the advantage that the exhaust-gas energy at the turbocharger can be better utilized over the entire engine speed range of the internal combustion engine. These shut-off members are however subjected to very high temperatures during operation. Deformations, for example a change of a shut-off member opening from a circular to a slightly oval shape, can therefore occur. This can in turn have the effect that the shut-off member no longer completely closes.

It is therefore an object of the present invention to at least partially eliminate the above-stated disadvantages.

One exemplary embodiment of the invention relates to a shut-off member for a turbocharger for an internal combustion engine. The shut-off member has a first channel; a second channel which is separated from the first channel by a wall; a shut-off member opening which is formed in the wall in order to connect the first and the second channel; a shut-off member body for selectively opening and closing the shut-off member opening, and also a cooling channel which runs in the wall and which at least partially surrounds the shut-off member opening. By means of the targeted cooling at the shut-off member, correct functioning of the shut-off member over a greater temperature range, and thus improved functioning of the switching between ram supercharging and pulse supercharging, can be attained.

According to a further exemplary embodiment of the invention, the cooling channel completely surrounds the shut-off member opening in a ring-shaped manner. In this way, uniform cooling of the shut-off member opening is attained, whereby an accuracy of shape of the shut-off member opening can be maintained over a greater temperature range.

According to a further exemplary embodiment of the invention, the cooling channel is equipped with an inlet and an outlet by means of which the cooling channel can be incorporated into a cooling or refrigeration circuit.

According to a further exemplary embodiment of the invention, the inlet and the outlet are arranged on opposite sides of the shut-off member opening. This facilitates the incorporation into the cooling or refrigeration circuit and offers good flow characteristics.

According to a further exemplary embodiment of the invention, the shut-off member is formed as a separate component.

According to a further exemplary embodiment of the invention, the shut-off member is formed as a single piece, in particular monolithically, with a cylinder head housing of the internal combustion engine.

According to a further exemplary embodiment of the invention, the cooling channel is incorporated into a cooling circuit which is formed in a material of the cylinder head housing.

The present invention furthermore provides an internal combustion engine having a first cylinder in which a first combustion chamber is formed, a second cylinder in which a second combustion chamber is formed, and a shut-off member of the type, wherein an exhaust-gas outlet of the first combustion chamber is connected to an inlet of the first channel and, separately therefrom, an exhaust-gas outlet of the second combustion chamber is connected to an inlet of the second channel.

The present invention furthermore provides a motor vehicle having such a shut-off member or such an internal combustion engine.

Preferred exemplary embodiments of the present invention will be described below with reference to the appended drawings.

DETAILED DESCRIPTION OF THE DRAWINGS

Figure 1:
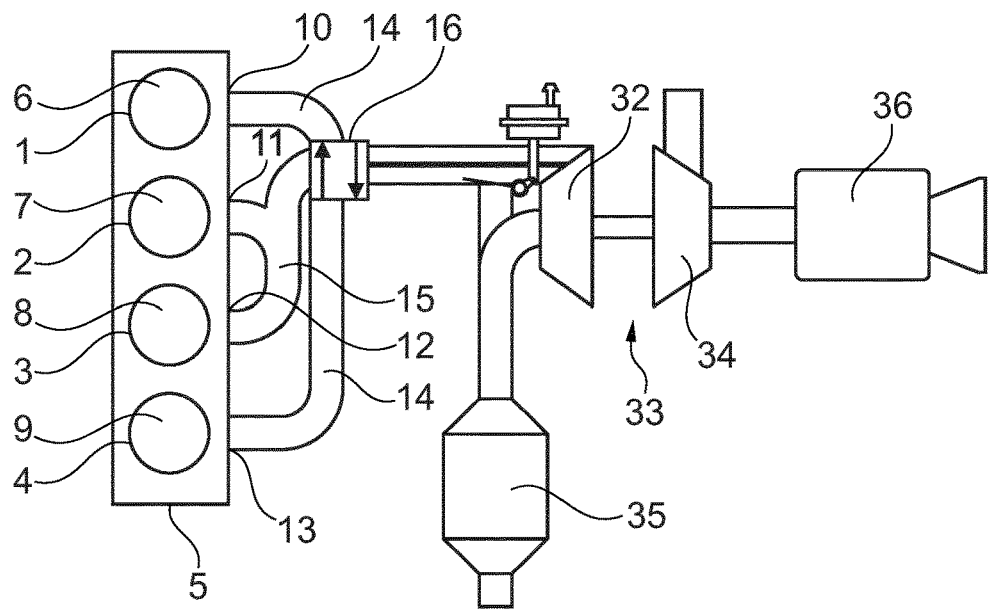
FIG. 1 schematically shows an internal combustion engine with a shut-off member according to the invention and with a turbocharger according to a first exemplary embodiment of the present invention.

FIG. 1 schematically shows an internal combustion engine, for example a gasoline engine or a diesel engine, which forms multiple cylinders 1-4, for example four or six. The internal combustion engine is that of a motor vehicle, in particular of a passenger motor vehicle. In the exemplary embodiment illustrated, the internal combustion engine has a first cylinder 1, a second cylinder 2, a third cylinder 3 and a fourth cylinder 4. The cylinders 1-4 are formed in an engine block 5, which in a known manner has a crankcase and a cylinder head housing. In a known manner, a combustion chamber is formed in each cylinder 1-4, that is to say the first cylinder 1 forms a combustion chamber 6, the second cylinder 2 forms a combustion chamber 7, the third cylinder 3 forms a combustion chamber 8 and the fourth cylinder 4 forms a combustion chamber 9. During operation, each of the combustion chambers 6-9 discharges combustion exhaust gas via at least one respectively associated exhaust-gas outlet 10-13, at which the exhaust gas exits the associated combustion chamber 6-9, that is to say exhaust gas is discharged from the first combustion chamber 6 via a first exhaust-gas outlet 10, exhaust gas is discharged from the second combustion chamber 7 via a second exhaust-gas outlet 11, exhaust gas is discharged from the third combustion chamber 8 via a third exhaust-gas outlet 12, and exhaust gas is discharged from the fourth combustion chamber 9 via a fourth exhaust-gas outlet 13.

Connected to the exhaust-gas outlets 10-13 are manifolds 14, 15, which connect the exhaust-gas outlets to a shut-off member 16. The shut-off member 16 serves for connecting channels of a turbocharger to one another or separating these from one another. This can in turn serve for effecting switching between ram supercharging and pulse supercharging of the turbocharger. The function is however not restricted to this. Accordingly, the channel connection also serves for enlarging the area of the turbine of the turbocharger that can be impinged on by flow.

Figure 2:
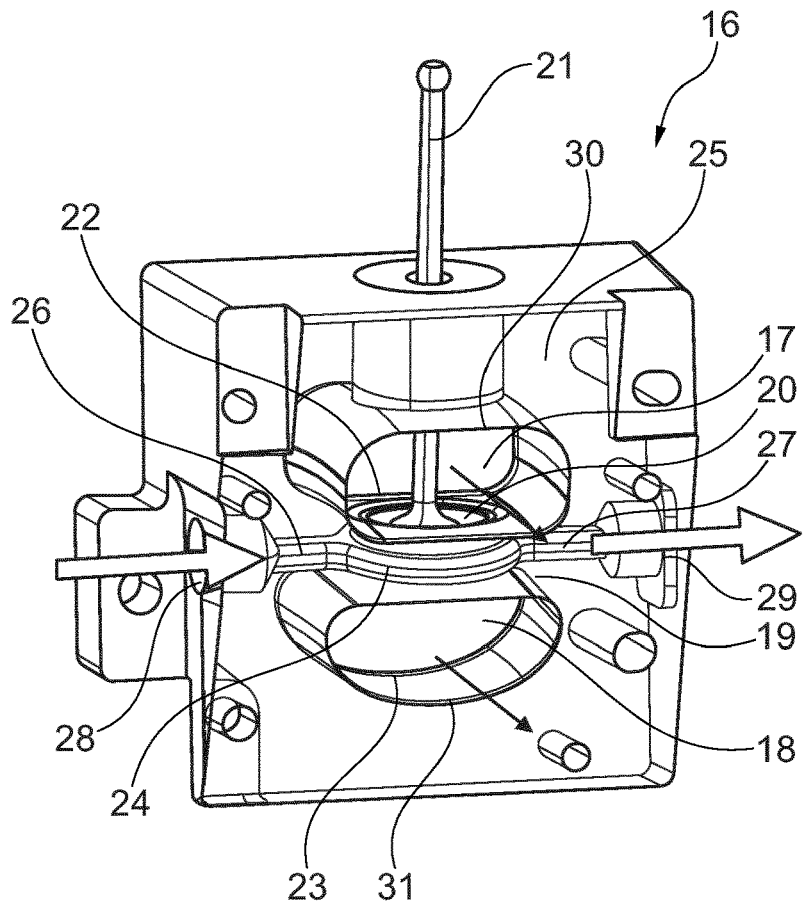
FIG. 2 shows the shut-off member of the exemplary embodiment from FIG. 1 in greater detail, and FIG. 3 schematically shows an internal combustion engine with a shut-off member according to the invention and with a turbocharger according to a second exemplary embodiment of the present invention.

FIG. 2 shows the shut-off member 16 in the form of a valve in greater detail. It is likewise possible, instead of the valve which is illustrated, to use a shut-off member in the form of a slide or in the form of a flap. The shut-off member 16 from FIG. 2 has two channels 17, 18, which are separated from one another by means of a wall 19. In the shut-off member 16, the two channels 17, 18 are connectable to one another within the shut-off member 16 exclusively via a shut-off member opening 20 which extends through the wall 19. The shut-off member opening 20 extends all the way through the wall 19, preferably with a circular cross section (as viewed along the direction in which it extends through). Some other cross section, for example oval, square, rectangular, etc., is however also possible. Furthermore, a shut-off member body 21 with a shut-off member plate is provided, wherein the latter selectively closes or opens the shut-off member opening 20. The shut-off member body 21 is displaceable in a direction perpendicular to the flow direction of the exhaust gases in the channels 18, 19. The shut-off member plate is for example circular and dimensioned such that it can close the shut-off member opening. The shut-off member body may also be in the form of a slide, a flap or the like. Correspondingly, the shut-off member body is then displaced, pivoted, rotated etc. for the purposes of opening and closing. An inlet 22 of the channel 17, which is situated upstream (with respect to the exhaust-gas flow) of the shut-off member opening 20, is connected via the manifold 14 to the exhaust-gas outlets 10 and 13 (see FIG. 1). The inlet 22 is not connected to the exhaust-gas outlets 11 and 12. An inlet 23 of the channel 18, which is situated upstream (with respect to the exhaust-gas flow) of the shut-off member opening 20, is connected via the manifold 15 to the exhaust-gas outlets 11 and 12 (see FIG. 1). The inlet 23 is not connected to the exhaust-gas outlets 10 and 13. The channels 17, 18 are formed in a housing 25 which is formed for example from solid material. The housing 25 comprises the wall 19 which is formed as a single piece, preferably monolithically, with the rest of the housing 25.

According to the invention, a cooling channel 24 runs in the wall 19, which cooling channel surrounds the shut-off member opening 20 at least in certain sections. In particular, the cooling channel 24 surrounds the shut-off member opening 20 in a closed ring-shaped manner. The ring-shaped section of the cooling channel 24 is equipped, on opposite sides, with an in particular rectilinearly running entry 26 and an in particular rectilinearly running exit 27. Where the entry and exit leave the housing 25, there are formed an inlet 28 and an outlet 29, by means of which the cooling channel 24 can be incorporated into a cooling or refrigeration circuit. The cooling circuit is for example a cooling circuit of the internal combustion engine, in which coolant can be circulated, and the refrigerant circuit is for example a refrigeration circuit of an air-conditioning system in which refrigerant can be circulated. A cooling circuit in which a fluid or a gas, for example air, is circulated would also be conceivable.

It would likewise also be conceivable for air to be conducted through the cooling channel 24 without a cooling circuit, wherein air is taken from the surroundings and is subsequently released to the surroundings again. The housing 25 is produced for example by 3D printing or by casting.

An outlet 30 of the channel 17, which is arranged downstream of the shut-off member opening 20, leads via a turbocharger scroll to a turbine 32, and, separately therefrom, an outlet 31 of the channel 18, which is arranged downstream of the shut-off member opening 20, leads via a turbocharger scroll to the turbine 32. The turbine 32 is the turbine of a turbocharger 33 which drives a compressor 34 which supercharges the internal combustion engine. FIG. 1 furthermore shows an exhaust-gas section 35 and an air intake tract 36.

Figure 3:
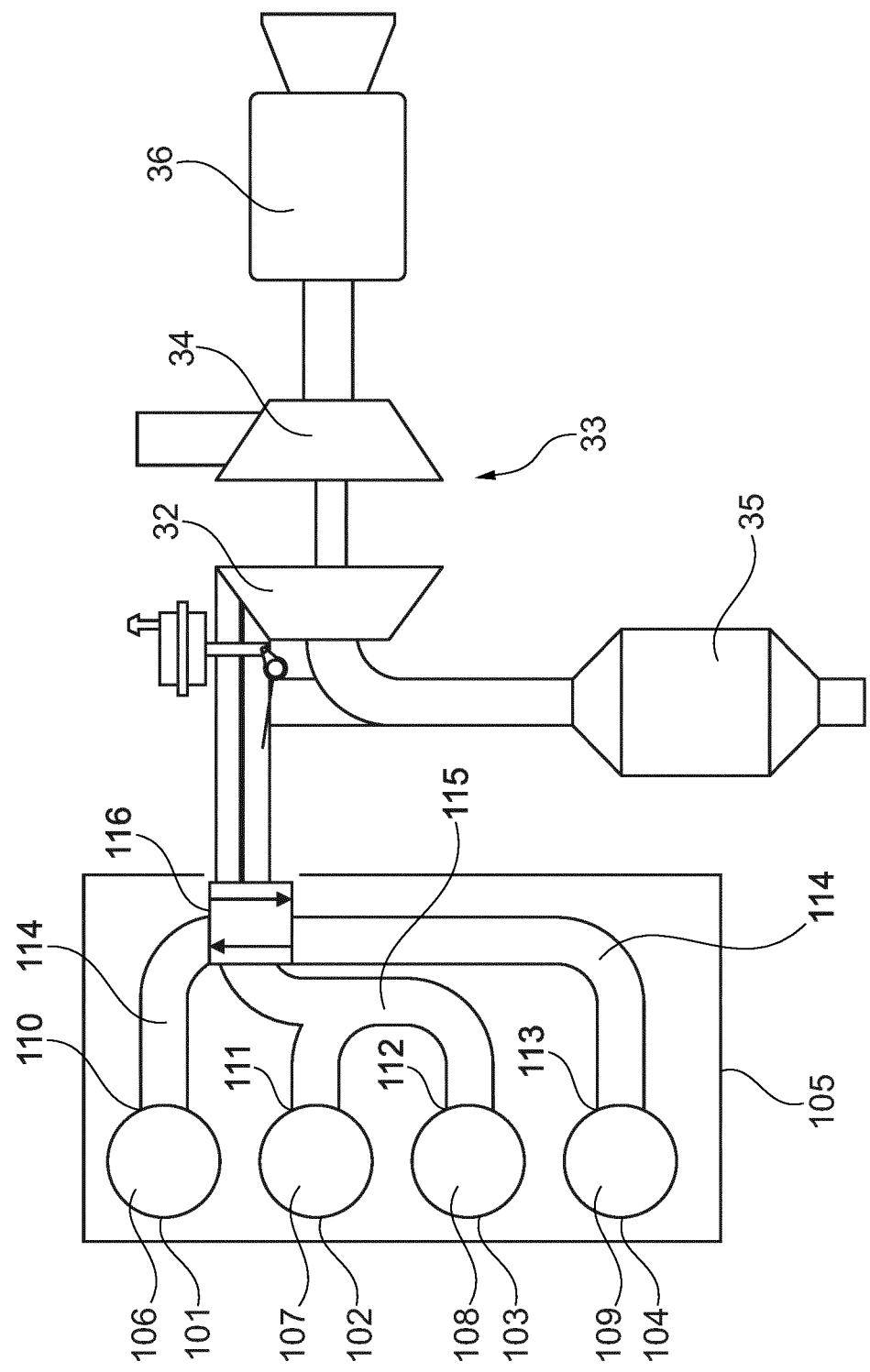

FIG. 3 schematically shows an internal combustion engine with a shut-off member according to the invention and with a turbocharger according to a second exemplary embodiment of the present invention. This is an internal combustion engine of a motor vehicle, in particular of a passenger motor vehicle.

The internal combustion engine from FIG. 3 is for example a gasoline engine or a diesel engine which forms multiple cylinders 101-104, for example four or six. In the exemplary embodiment illustrated, the internal combustion engine has a first cylinder 101, a second cylinder 102, a third cylinder 103 and a fourth cylinder 104. The cylinders 101-104 are formed in an engine block 105, which in a known manner has a crankcase and a cylinder head housing. In a known manner, a combustion chamber is formed in each cylinder 101-104, that is to say the first cylinder 101 forms a combustion chamber 106, the second cylinder 102 forms a combustion chamber 107, the third cylinder 103 forms a combustion chamber 108 and the fourth cylinder 104 forms a combustion chamber 109. During operation, each of the combustion chambers 106-109 discharges combustion exhaust gas via at least one respectively associated exhaust-gas outlet 110-113, at which the exhaust gas exits the respectively associated combustion chamber 106-109, that is to say exhaust gas is discharged from the first combustion chamber 106 via a first exhaust-gas outlet 110, exhaust gas is discharged from the second combustion chamber 107 via a second exhaust-gas outlet 111, exhaust gas is discharged from the third combustion chamber 108 via a third exhaust-gas outlet 112, and exhaust gas is discharged from the fourth combustion chamber 109 via a fourth exhaust-gas outlet 113.

At the exhaust-gas outlets 110-113, there are formed an exhaust-gas channel 114, in the form of an internal channel, and an exhaust-gas channel 115, in the form of an internal channel, which exhaust-gas channels connect the exhaust-gas outlets 110-113 to a shut-off member 116, in particular for the switching between ram supercharging and pulse supercharging. The exhaust-gas channels 114 and 115 may be formed as internal channels in the material of the cylinder head housing.

Whereas, in the first exemplary embodiment, the shut-off member 16 is a separate component, in particular separate from the cylinder head housing, which is connected by means of manifolds 14, 15 to the engine block 5, in particular to the cylinder head housing, it is the case in the second exemplary embodiment that the shut-off member 116 is provided, which is integrated into the engine block 105. This means that the housing 25 of the shut-off member 116 is formed as a single piece, in particular monolithically, with the cylinder head housing of the engine block 105.

The shut-off member 116 corresponds to the shut-off member 16 from the first exemplary embodiment, with the difference that the shut-off member 116 is formed as a single piece with the cylinder head housing. Otherwise, with regard to the shut-off member 116, reference is made to the description of the shut-off member 16 according to the first exemplary embodiment. Instead of external lines which are connectable to the inlet 28 and to the outlet 29 in order to incorporate the cooling channel 24 into a cooling or refrigeration circuit, it is possible in the second exemplary embodiment for internal lines to be provided which are formed in the material of the unit composed of cylinder head housing and housing 25, which unit is formed as a single piece.

With regard also to the elements 32-36, reference is otherwise made to the description of the first exemplary embodiment.

Whilst the invention has been illustrated and described in detail in the drawings and in the description above, this illustration and description is to be understood as an illustration or as an example and not as limiting, and it is not intended to limit the invention to the disclosed exemplary embodiment. The mere fact that particular features are mentioned in different dependent claims is not intended to indicate that a combination of these features could not also be advantageously utilized.

What is claimed is:

1. A shut-off member for a turbocharger of an internal combustion engine, comprising:
   a first channel;
   a second channel;
   a wall, wherein the wall separates the first channel from the second channel;
   a shut-off member opening defined by the wall, wherein the shut-off member opening connects the first channel and the second channel;
   a shut-off member body, wherein the shut-off member opening is selectively openable and closable by the shut-off member body and wherein the shut-off member body is displaceable in a direction perpendicular to a direction of flow of respective exhaust gases in the first channel and the second channel; and
   a cooling channel, wherein the cooling channel is disposed at a location in the wall that defines the shut-off member opening and completely surrounds the shut-off member opening in a closed ring-shaped manner to cool the wall such that the shut-off member opening is not deformed;
   wherein an inlet of the first channel is disposed upstream of the shut-off member opening with respect to the direction of flow and is connected via a first manifold to first exhaust gas outlets of the internal combustion engine and wherein an outlet of the first channel is disposed downstream of the shut-off member opening with respect to the direction of flow and leads to a turbine;
   wherein an inlet of the second channel is disposed upstream of the shut-off member opening with respect to the direction of flow and is connected via a second manifold to second exhaust gas outlets of the internal combustion engine and wherein an outlet of the second channel is disposed downstream of the shut-off member opening with respect to the direction of flow and leads to the turbine.

2. The shut-off member according to claim 1, wherein the cooling channel has an inlet and an outlet and wherein the cooling channel can be incorporated into a cooling circuit or a refrigeration circuit via the inlet and the outlet.

3. The shut-off member according to claim 2, wherein the inlet and the outlet are disposed on opposite sides of the shut-off member opening.

4. The shut-off member according to claim 1, wherein the shut-off member is formed as a separate component.

5. The shut-off member according to claim 1 in combination with an internal combustion engine, wherein the shut-off member is formed as a single piece with a cylinder head housing of the internal combustion engine.

6. The shut-off member according to claim 5 in combination with the internal combustion engine, wherein the cooling channel is incorporated into a cooling circuit which is formed in a material of the cylinder head housing.

7. An internal combustion engine, comprising:
   a first cylinder in which a first combustion chamber is formed;
   a second cylinder in which a second combustion chamber is formed; and
   the shut-off member according to claim 1.

8. A motor vehicle, comprising:
   the shut-off member according to claim 1 or the internal combustion engine according to claim 7.

* * * * *